(12) United States Patent
Nakayama

(10) Patent No.: US 8,455,748 B2
(45) Date of Patent: Jun. 4, 2013

(54) TUNER DEVICE

(75) Inventor: Masayuki Nakayama, Hamamatsu (JP)

(73) Assignee: Roland Corporation, Hamamatsu (JP)

( * ) Notice: Subject to any disclaimer, the term of this patent is extended or adjusted under 35 U.S.C. 154(b) by 458 days.

(21) Appl. No.: 12/913,621

(22) Filed: Oct. 27, 2010

(65) Prior Publication Data
US 2011/0103600 A1 May 5, 2011

(30) Foreign Application Priority Data
Oct. 30, 2009 (JP) .................................. 2009-251485

(51) Int. Cl.
*G10H 5/00* (2006.01)

(52) U.S. Cl.
USPC ............................................. 84/654; 84/454

(58) Field of Classification Search
USPC .................. 84/616, 654, 312 R, 454, 455
See application file for complete search history.

(56) References Cited

U.S. PATENT DOCUMENTS 6,525,255 B1 * 2/2003 Funaki ............................ 84/616
7,547,838 B2 * 6/2009 Okuyama et al. ............... 84/454

* cited by examiner

*Primary Examiner* — Jeffrey Donels
(74) *Attorney, Agent, or Firm* — Foley & Lardner LLP

(57) ABSTRACT

A pitch detection device in which a frequency can be lowered after having maintained both a pitch error accuracy and a response time at practical values to reduce current consumption. Because a number of times of cumulative addition is changed in response to a pitch of a measured signal, a cumulative addition time sum equals or exceeds a constant T_SUM_MIN. Accordingly, a pitch error accuracy of the measured signal achieves a required error accuracy. Furthermore, a frequency of the clock signal is decided using a numerical formula (6) and a numerical formula (7) so that the constant T_SUM_MIN does not exceed a required response time. Accordingly, a response time is within the required response time regardless of whether the frequency of the measured signal is lowered.

14 Claims, 7 Drawing Sheets

TUNER DEVICE

CROSS-REFERENCE TO RELATED PATENT APPLICATIONS

Japan Priority Application 2009-251485, filed Oct. 30, 2009 including the specification, drawings, claims and abstract, is incorporated herein by reference in its entirety.

BACKGROUND

1. Field of the Invention

Embodiments of the present invention generally relate to tuner device systems and methods, and, in specific embodiments, to tuner device systems and methods that allows for pitch detection that maintains pitch error accuracy and response time while allowing for the frequency of a clock signal to be reduced.

2. Related Art

In a conventional pitch detection device (e.g., a tuning device that detects the pitch of a musical note that has been input and indicates the deviation from a standard pitch), the pitch of the musical note that was input (pitch of the measured signal) is detected using a clock signal of several hundred KHz to several MHz. Here, the method of pitch detection of a measured signal in a conventional pitch detection device is explained with reference to FIG. 7.

The conventional pitch detection includes a central processing unit (CPU) that regards one clock of a clock signal as the smallest base unit (the smallest base unit that becomes the standard at the time of the measurement of time length) and measures the duration of one cycle of the measured signal (S71) a predetermined number (fixed number) of times. Then, the average time (average cycle) of the duration of one cycle of the measured signal is calculated (S72). From there, the pitch is found (S73).

With respect to the conventional pitch detection device, in order to effectively reduce the pitch error accuracy of the measured signal (error that occurs at the time of pitch calculation) and the response time (the time from when the measured signal is input until the pitch of the measured signal is newly detected), a clock signal of one hundred kHz or more (e.g., 500 kHz or more) is necessary.

When a clock signal of 500 kHz or more is used, the current consumption by the pitch detection device is about one hundred µA due to the height of this frequency. It is well known that lowering the frequency of the clock signal is an effective method to lower the current consumption of the device (e.g., to several tens of µA). However, with such devices, when the frequency of the clock signal is lowered, the pitch error accuracy of the measured signal and the response time at values are not properly maintained.

As noted above, the conventional pitch detection device regards one clock of a clock signal as the smallest base unit (the smallest base unit that becomes the standard at the time of the measurement of time length) and measures the duration of one cycle of the measured signal generated between the interrupts based on zero-cross. Next, one cycle of the measured signal is detected (as known in the art) based on an autocorrelation function. Then, finally, the duration of 1 cycle detected is determined by multiplying the time length of a clock signal with the number of counted clocks.

Using the conventional pitch detection device causes a measurement error k to arise, as will be explained. First, when one cycle of the measure signal was the portion between the k−1 clock portion and the k clock portion, the measurement error with respect to the duration of one cycle of the measured signal, in the k clock portion, amounts to error due to the fact of being a little longer than the true duration of one cycle of the measured signal. Second, when one cycle of the measured signal was the portion between the k clock portion and the k+1 clock portion, the measurement error with respect to the duration of one cycle of the measured signal, in the k clock portion, amounts to error due to the fact of being a little shorter than the true duration of one cycle of the measured signal. As such, the true duration of 1 cycle of that measured signal is a duration in the middle of the total duration of the k−1 clock portion and the total duration of the k+1 portion of a clock signal. However, in a pitch detection device, the duration of one cycle of a measured signal is measured as the duration of the k clock portion of the clock signal. As such, because the measurement of the duration of one cycle of the measured signal is discretely carried out with one clock of the clock signal as the smallest base unit, the errors that occur in that measurement also occur discretely.

The pitch error accuracy and the response time of the measured signal can be measured using formulas (1), (2), and (3) where the pitch error accuracy is d (cent), response time is t (s), the frequency of a measured signal is f (Hz), the number of times of detection of a cycle of a measured signal is N (times), the frequency of the clock signal is Fc (Hz), and the number of clock signals counted within the total duration that measures 1 cycle of a measured signal N times is p (clock). Furthermore, as for pitch error accuracy d, error is indicated in cent units (1 cent is an interval of 1/1200 of an octave).

$$d = 1200 \times \log 2(p/(p-1)) \tag{1}$$

$$t = N/f \tag{2}$$

$$p = Fc \times (N/f) \tag{3}$$

Furthermore, Fc/f is the number of clocks counted during 1 cycle of the measured signal. Accordingly, the number of clocks p indicated by formula (3) can also be varied as in the following numerical formula (3') as the number of clocks counted within the time the cycles of a measured signal have been measured N times.

$$p = (Fc/f) \times N \tag{3'}$$

The p represented in this numerical formula (3') is the total number of clocks counted during the total duration in which the cycles of the measured signal (e.g., the music notes collected by a microphone) were measured N times.

Furthermore, in numerical formula (1), the logarithm of the ratio of the number of clocks p and the number of clocks (p−1) is calculated. In other words, the pitch error accuracy d indicates an error that occurs between the number of clocks p and the number of clocks (p−1).

Accordingly, the pitch error accuracy indicating the error that occurs between the number of clocks p and the number of clocks (p+1) can be found as shown in numerical formulary (1').

$$d = 1200 \times \log 2((p+1)/p) \tag{1'}$$

However, this numerical formula results in reduced pitch error accuracy. For this reason, hereinafter, the pitch error accuracy d will be found using numerical formula (1).

EXAMPLE 1

The design conditions of this pitch detection device are as follows: clock signal frequency (Fc): 500 kHz; detection range of the frequency (f) of the measured signal: 30.9 Hz-659 Hz; pitch error accuracy (d) of measured signal: ±1 cent; and response time (t): within 150 ms.

Here, the number of times of detection N of a cycle of the measured signal is regarded as four times. The 30.9 Hz of the lowest frequency in the detection range of the frequency f of the measured signal corresponds to the fifth string open sound of a five string bass. The 659 Hz of the highest frequency corresponds to the first string open sound of a violin. Accordingly, such a pitch detection device can be used with a tuner for musical instruments ranging from wind instruments to stringed instruments.

Hereinafter, the design conditions with respect to the pitch error accuracy d of a measured signal are called the "required error accuracy"; and the design conditions with respect to the response time t are called "required response time."

Using the formulas above, the pitch error accuracy d can be calculated to be 0.027 cent when the frequency f is 30.9 Hz and 0.571 cent when the frequency is 659 Hz, both of which are within the required error accuracy. Furthermore, the response time t can be calculated to be 129 ms when the frequency f is 30.9 Hz and 6.07 ms when the frequency f is 659 Hz, both of which are within the required response time. Accordingly, when a clock signal of 500 kHz is used, the values of both the pitch error accuracy d and the response time t are regarded as effective values.

Furthermore, when the clock signal frequency Fc is greater than 500 kHz, the value of the pitch error accuracy d is made smaller and the value of the response time t is made shorter. As such, when a clock signal frequency Fc of more than 500 kHz is used, the values of both the pitch error accuracy d and the response time t are regarded as effective values.

EXAMPLE 2

The design conditions of this pitch detection device are as follows: clock signal frequency (Fc): 32.768 kHz; detection range of the frequency (f) of the measured signal: 30.9 Hz-659 Hz; pitch error accuracy (d) of measured signal: ±1 cent; and response time (t): within 150 ms.

Here, the number of times of detection N of a cycle of the measured signal is regarded as four times. Using the formulas above, the pitch error accuracy d can be calculated to be 0.408 cent when the frequency f is 30.9 Hz and 8.727 cent when the frequency is 659 Hz, the latter of which is outside the required error accuracy of ±1 cent. (Furthermore, the response time t can be calculated to be 129 ms when the frequency f is 30.9 Hz and 6.07 ms when the frequency f is 659 Hz, both of which are within the required response time.)

Using example 2, the required error accuracy of ±1 cent can be obtained if the number of times of detection N of the cycle of the measured signal is increased from four times to 35 times. Accordingly, when the number of times of detection N is 35 times, the pitch error accuracy d can be calculated to be to 0.047 cent when the frequency f is 30.9 Hz and 0.995 cent when the frequency f is 659 Hz, both of which are within the required error accuracy. However, the response time t in this instance is 1133 ms when the frequency f is 30.9 Hz and 53.1 ms when the frequency f is 659 Hz, the former of which is not within the required response time of 150 ms.

Therefore, when a clock signal frequency Fc of 32.768 kHz (counter clock signal) is used, at least one of the pitch error accuracy d and the response time t will not satisfy the required error accuracy or the required response time. In other words, with the conventional pitch detection device, it is difficult to maintain both the pitch error accuracy d and the response time t to effective values simply by lowering the frequency Fc of a clock signal.

SUMMARY OF THE DISCLOSURE

A pitch detection device may include but is not limited to an input means, a clock generation means, a pitch calculation means, a cycle detection means, a cycle measurement means, a cumulative cycle measurement means, and a frequency counting means. The input means may be for inputting a signal. The clock generation means may be for generating a clock signal. The pitch calculation means may be for calculating a pitch of the signal by determining a duration of one cycle of the signal that regards one clock of the clock signal as the smallest base unit. The cycle detection means may be for detecting one cycle of a waveform of the signal. The cycle measurement means may be for discretely measuring a measurement time of one cycle of the signal during one clock of the clock signal, for each one cycle of the signal detected by the cycle detection means. The cumulative cycle measurement means may be for cumulatively adding, for every one cycle of the signal, the measurement time corresponding to each one cycle of the signal measured by the cycle measurement means to obtain a cumulative time. The cumulative adding may end when the cumulative time equals or exceeds a smallest measurement time that realizes a required pitch error accuracy. The frequency counting means may be for counting frequencies of the signal included within the cumulative time when the cumulative adding ends. The pitch calculation means may calculate the pitch of the signal from the cumulative time and a number of the counted frequencies.

As such, the smallest measurement time is the time that realizes the required pitch error accuracy. Accordingly, until it becomes a time at or above this smallest measurement time, the time of each cycle of a signal is continuously and discretely measured for each 1 cycle, and the error accuracy of the pitch of the signal, which is calculated from the cumulative time and the counted frequencies, satisfies the required error accuracy. The cumulative cycle measurement means operates so that, when the pitch of the signal is high, the duration of one cycle of a signal is short and increases the number of times of cumulative addition. As such, the cumulative time becomes the smallest measurement time or more. On the other hand, when the pitch of the signal is low, the duration of one cycle of the signal is long and reduces the number of times of cumulative addition. As such, the cumulative time becomes the smallest measurement time or more. Accordingly, the cumulative cycle measurement means causes the number of times of cumulative addition to change in response to the pitch of the measured signal and operates so that the cumulative time becomes the smallest measurement time or more. Here, the smallest measurement time, as mentioned, is the time that realizes the required pitch error accuracy. Consequently, the pitch of the signal calculated by the above-described method that uses the cumulative time satisfies the required error accuracy.

Furthermore, the cumulative cycle measurement means ends cumulative addition when the cumulative time has become the smallest measurement time (or more). As such, because the end of cumulative addition by the cumulative cycle measurement means is regarded as when the cumulative time has become the smallest measurement time or more, the time (response time) until the pitch calculation means newly calculates the pitch of the signal can be made a fixed time or less (i.e., the time found by the sum of the cycle of the lowest measurable sound and the smallest measurement time, or less) regardless of the pitch of the musical note. Here, by making the time found by the sum of the cycle of the lowest measurable sound and the smallest measurement time within the time required as a design condition, the response time can be held to within the time required as a design condition.

Because the frequency of the clock signal can be lowered upon both the pitch error accuracy of the measured signal and the response time having satisfied the values required as the design conditions (after having maintained values with which there is no problem from a practical standpoint), current consumption can be reduced.

In such embodiments, all frequencies of the signal amount to two (frequencies) in a case where the measurement time of a first cycle of the signal and a measurement time of a second cycle of the measured signal are cumulatively added by the cumulative cycle measurement means when the cumulative adding ends. All frequencies of the signal amount to three (frequencies) in a case where the first cycle, the second cycle, and a third cycle are cumulatively added.

In some embodiments, the smallest measurement time may be calculated from (i) the required pitch error accuracy when the pitch of the signal is calculated by the pitch calculation means and (ii) a frequency of the clock signal regarded as the smallest base unit when the cycle measurement means measures the measuring time of the one cycle of the signal. As such, the smallest measurement time can be found simply without carrying out complicated calculations.

A pitch detection device may include (but is not limited to) an input means, a clock generation means, a pitch calculation means, a cycle detection means, a clock counting means, a cumulative clock counting means, and a frequency counting means. The input means may be for inputting a signal. The clock generation means may be for generating a clock signal. The pitch calculation means may be for calculating a pitch of the signal by determining a number of clocks in one cycle of the signal that regards one clock of the clock signal as the smallest base unit. The cycle detection means may be for detecting one cycle of a waveform of the signal. The clock counting means may be for counting the number of clocks of one cycle of the signal for each one cycle of the signal detected by the cycle detection means. The cumulative clock counting means may be for cumulatively adding, for every one cycle of the signal, the number of clocks corresponding to each one cycle of the signal counted by the clock counting means to obtain a cumulative number of clocks. The cumulative adding may end when the cumulative number of clocks equals or exceeds a smallest number of clocks that realizes a required pitch error accuracy. The frequency counting means may be for counting frequencies of the signal included within the cumulative number of clocks when the cumulative adding ends. The pitch calculation means may calculate the pitch of the signal from a frequency of the clock signal, the cumulative number of clocks, and a number of the counted frequencies of the signal. Such embodiments allow for some of the same benefits and uses as above.

In some embodiments, the smallest number of clocks may be calculated from the required pitch error accuracy when the pitch of the signal is calculated by the pitch calculation means. As such, the smallest measurement time can be found simply without carrying out complicated calculations.

A pitch detection device may include (but is not limited to) an input terminal, a clock generator, and a processor. The input terminal may be configured to input an audio signal. The clock generator may be configured to generate a clock signal. The processor may be configured to calculate a pitch of the audio signal by determining a duration of one cycle of the audio signal that regards one clock of the clock signal as the smallest base unit. The processor may be configured to measure a measurement time of one cycle of the audio signal using one clock of the clock signal as the smallest base unit. The processor may be configured to obtain a cumulative time by adding the measurement times of one or more cycles of the audio signal until the cumulative time equals or exceeds a threshold. The processor may be configured to calculate the pitch of the audio signal based on the cumulative time and the number of times the measurement times was added until the cumulative time equaled or exceeded the threshold.

In some embodiments, the threshold may be a smallest measurement time that realizes a required pitch error accuracy. In further embodiments, the smallest measurement time may be calculated from (i) the required pitch error accuracy when the pitch of the signal is calculated and (ii) a frequency of the clock signal. In further embodiments, wherein the required pitch error accuracy may be ±1 cent. In some embodiments, the clock generator may be configured to generate the clock signal at a frequency of 32.786 kHz.

A pitch detection device may include (but it not limited to) an input terminal, a clock generator, and a processor. The input terminal may be configured to input an audio signal. The clock generator may be configured to generate a clock signal. The processor may be configured to calculate a pitch of the audio signal by determining a number of clocks of one cycle of the audio signal that regards one clock of the clock signal as the smallest base unit. The processor may be configured to count a number of clocks of the cycle. The processor may be configured to obtain a cumulative number of clocks by adding the number of clocks of one or more cycles of the audio signal until the cumulative number of clocks equals or exceeds a threshold. The processor may be configured to calculate the pitch of the audio signal based on a frequency of the clock signal, the cumulative number of clocks, and the number of times the number of clocks of one cycle of the audio signal were added until the cumulative number of clocks equaled or exceeded the threshold.

In some embodiments, the threshold may be a smallest number of clocks that realizes a required pitch error accuracy. In further embodiments, the smallest number of clocks may be calculated from the required pitch error accuracy. In further embodiments, the required pitch error accuracy may be ±1 cent. In some embodiments, the clock generator may be configured to generate the clock signal at a frequency of 32.786 kHz.

DETAILED DESCRIPTION

Figure 1:
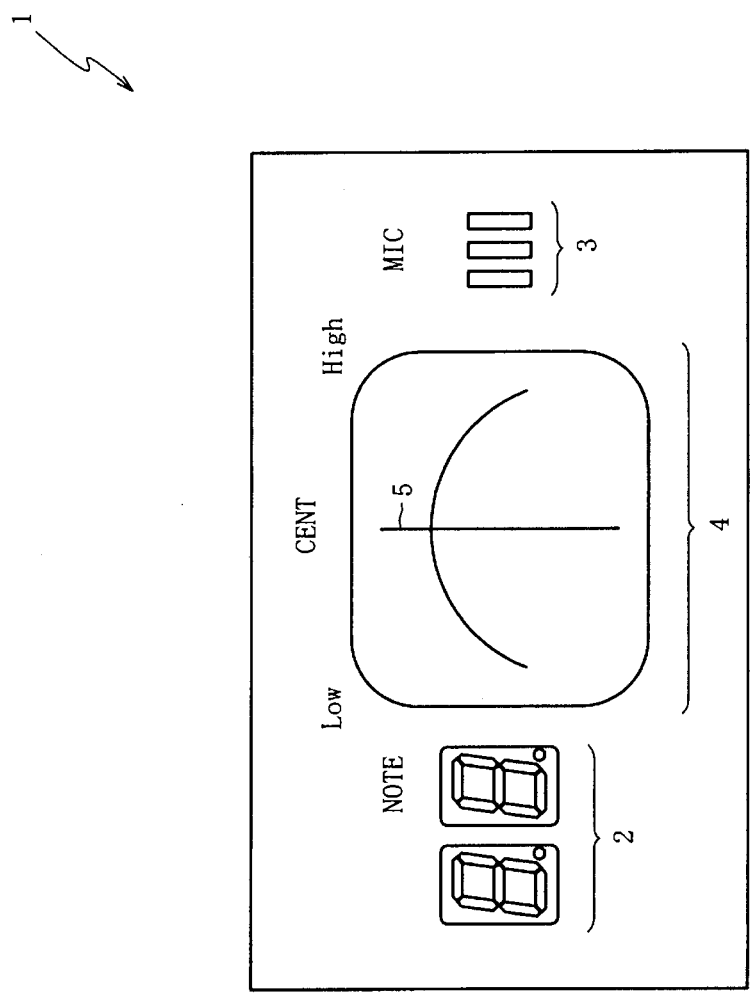
FIG. 1 is an exterior view of a tuner for a musical instrument according to an embodiment of the present invention.

FIG. 1 is an exterior view of a tuner 1 for use with a musical instrument. In various embodiments, the tuner 1 may be configured to restrain current consumption (relative to conventional pitch detection devices in which the clock signal frequency is several hundred kHz) by lowering the clock signal frequency to about several tens of kHz after both the error accuracy (d) of a pitch of a musical note that has been input (so as to be measured) and the response time (t) have satisfied the values required as design conditions of the tuner 1.

The tuner 1 may use (but is not limited to) the design conditions provided below. The frequency (Fc) of a clock signal is 32.768 kHz; the detection range of the frequency (f) of a measured signal is 30.9 Hz-659 Hz; the required error accuracy (d) is ±1 cent; and the required response time (t) is within 150 ms. Other embodiments may employ different design conditions as may be required.

The tuner 1 may include, but is not limited to, a digital indicator 2, a mic 3, and an analog indicator 4. The mic 3 is a microphone for collecting sound of musical notes (measured signals) for tuning. The digital indicator 2 is an indicator that displays the pitch names closest to the pitch of the musical note collected by the mic 3. In some embodiments, the digital indicator 2 may comprise two 7-segment LEDs (light emitting devices). For example, when the musical note of the note name A (la) of the second interval in the G clef has been input in a score, the display of "A4" may be displayed by the digital indicator 2. In other embodiments, the digital indicator 2 may comprise any number and/or any type of LEDs. In yet other embodiments, the digital indicator 2 may comprise any suitable visual display device, such as (but not limited to), an LCD (liquid crystal display), or the like.

The analog indicator 4 is an analog indicator that displays in cent units (or other suitable units) a deviation (cent difference) of the pitch of the musical note collected by the mic 3 from the reference pitch displayed in the digital indicator 2. In some embodiments, the analog indicator 4 may include a needle 5 (or other indicator) for indicating the deviation. For instance, if the pitch of the musical note collected by the mic 3 is lower than the reference pitch, the needle 5 of the analog indicator 4 deviates to the left side; and if the pitch of the musical note collected by the mic 3 is higher than the reference pitch, the needle 5 of the analog indicator 4 deviates to the right.

Figure 2:
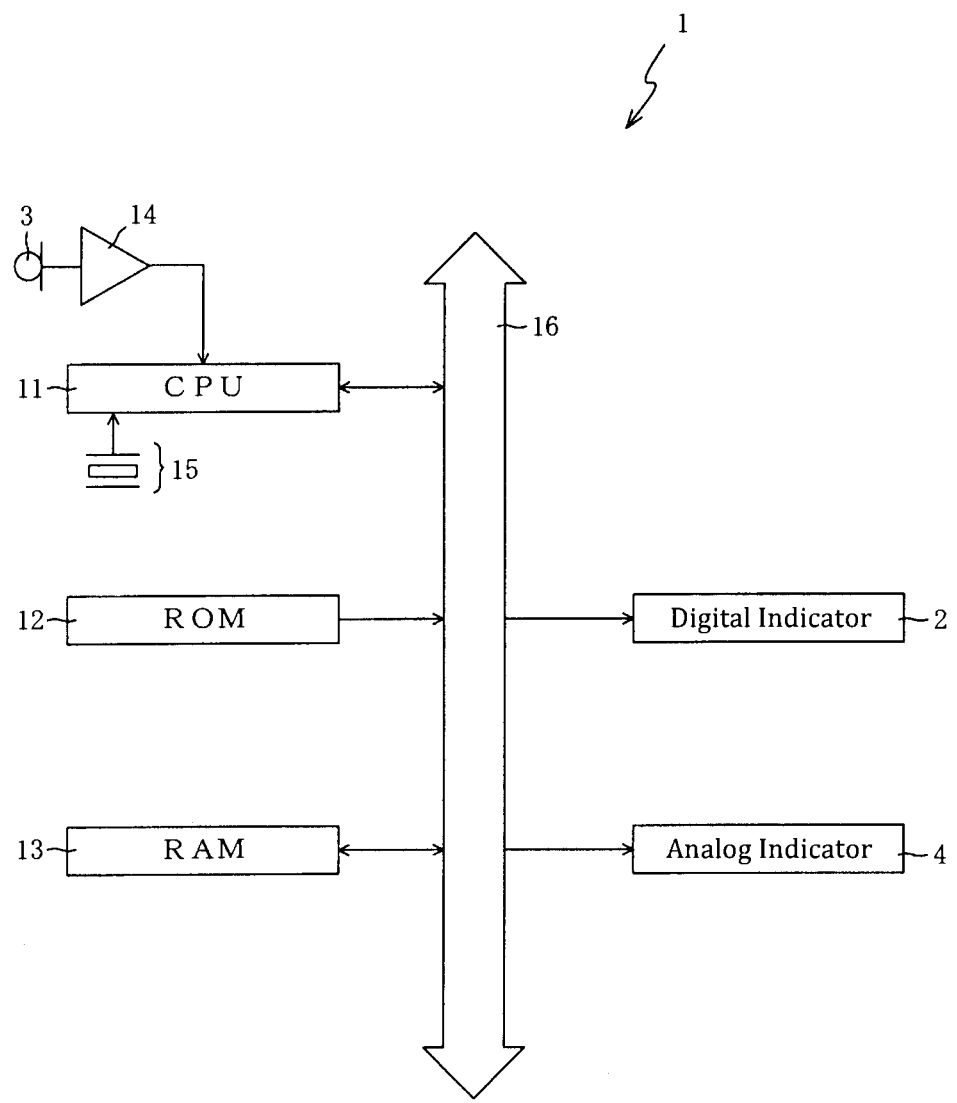
FIG. 2 is a block diagram of an electrical configuration of a tuner for a musical instrument according to an embodiment of the present invention.

FIG. 2 is a block diagram of an electrical configuration of the tuner for a musical instrument. With reference to FIGS. 1 and 2, the tuner 1 for musical instrument use may comprise a CPU 11, ROM 12, RAM 13, the mic 3, a comparator 14, a counter clock oscillator 15, the digital indicator 2, and the analog indicator 4. Each component (e.g., 2, 4, 11-13) may be respectively connected (directly or indirectly) to the input-output (I/O) port 16.

The CPU 11 is a control device (e.g., processor) for controlling the components (e.g., 2, 4, 12, 13 connected to the I/O port 16 and the components (e.g., 14, 15) connected to the CPU 11. The ROM 12 is non-rewritable memory in which a control program or the like is stored. The control program may be executed by the tuner 1, for example, to run a particular process (e.g., described in FIG. 3). The RAM 13 is memory for temporarily storing various types of data. For instance, the RAM 13 may temporarily store data used in a particular process (e.g., FIG. 3).

The comparator 14 is a device that inputs the analog signal output from the mic 3 (the electrical signal into which the musical notes collected by the mic 3 were converted). The comparator 14 detects zero crossing in the rise time of the analog signal and outputs a zero cross interrupt signal by the timing that detected the zero crossing. An input of the comparator 14 is connected to an output of the mic 3. An output of the comparator 14 is connected to the CPU 11.

The counter clock oscillator 15 is a quartz oscillator that outputs a clock signal with a frequency Fc of 32.768 kHz (according to at least one embodiment). Using this clock signal, the CPU 11 discretely measures the interval between zero crossings (i.e., one cycle) of the musical note obtained by the mic 3, and regards 1 cycle of the clock signal as 1 unit of the standard (as the smallest base unit).

Figure 3:
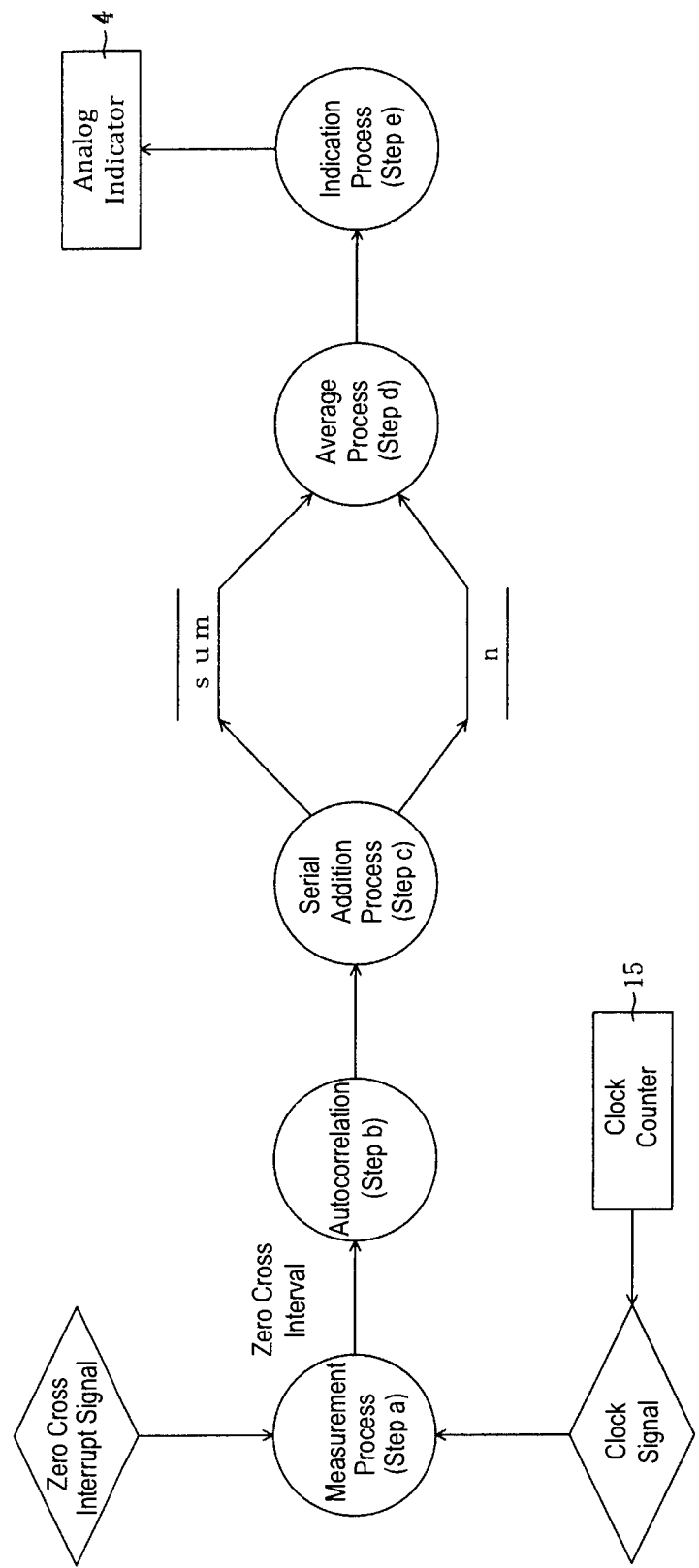
FIG. 3 is a flowchart of a main process according to an embodiment of the present invention.

FIG. 3 is a flowchart of a main process for detecting the pitch of the musical note obtained by the mic 3 (FIGS. 1 and 2) and indicating the deviation from the standard pitch. With reference to FIGS. 1-3, in the main process, first, the comparator 14 detects an input rise zero crossing and outputs to the CPU 11 a zero cross interrupt signal in response to the detection. The CPU 11 discretely measures the interval of the output time of the zero cross interrupt signal and regards 1 clock of the clock signal as 1 unit (Measurement process, Step a).

Next (Step b), the CPU 11 carries out autocorrelation based on the interval of the output time of the zero cross interrupt signal discretely measured by the measurement process of Step a. In the autocorrelation process, the CPU 11, based on an autocorrelation function, detects one cycle of the musical note obtained by the mic 3. Then, the CPU 11 discretely measures the interval of the cycle and regards one clock of the clock signal as the smallest base unit. Specifically, the interval for 1 cycle of a musical note discretely measured (that regards one clock of the clock signal as the smallest base unit) is obtained as buf[0], buf[1], ..., buf[n], ... for each respective cycle of the musical note gathered by the mic 3. That is, the first interval is buf[0], the second interval is buf[1], and the (n)-th interval is buf[n−1].

$$buf[n]=clk/Fc \quad (4)$$

According to numerical formula (4), buf[n] is the measurement value of a cycle of a musical note of n+1 times in the measurement of the duration of the cycle of a musical note, wherein the unit is seconds (s). clk indicates the number of clocks counted in 1 cycle of n+1 times, of the musical note obtained by the mic 3. Fc is the frequency of the clock signal wherein the unit is hertz (Hz). (Furthermore, 1/Fc is a cycle of a clock signal wherein the unit is seconds (s).) buf[0] is the initial measurement value (in the first cycle) of the measurement result of the duration of 1 cycle of a musical note; buf[1] is the second measurement value (in the second cycle); similarly, buf[n] is the n+1 measurement value (in the n+1 cycle).

Next, the CPU 11 sequentially stores in the RAM 13 each interval of 1 cycle of a musical note discretely measured, for every 1 cycle (e.g., buf[0], buf[1], ..., buf[n], ...).

Figure 4:
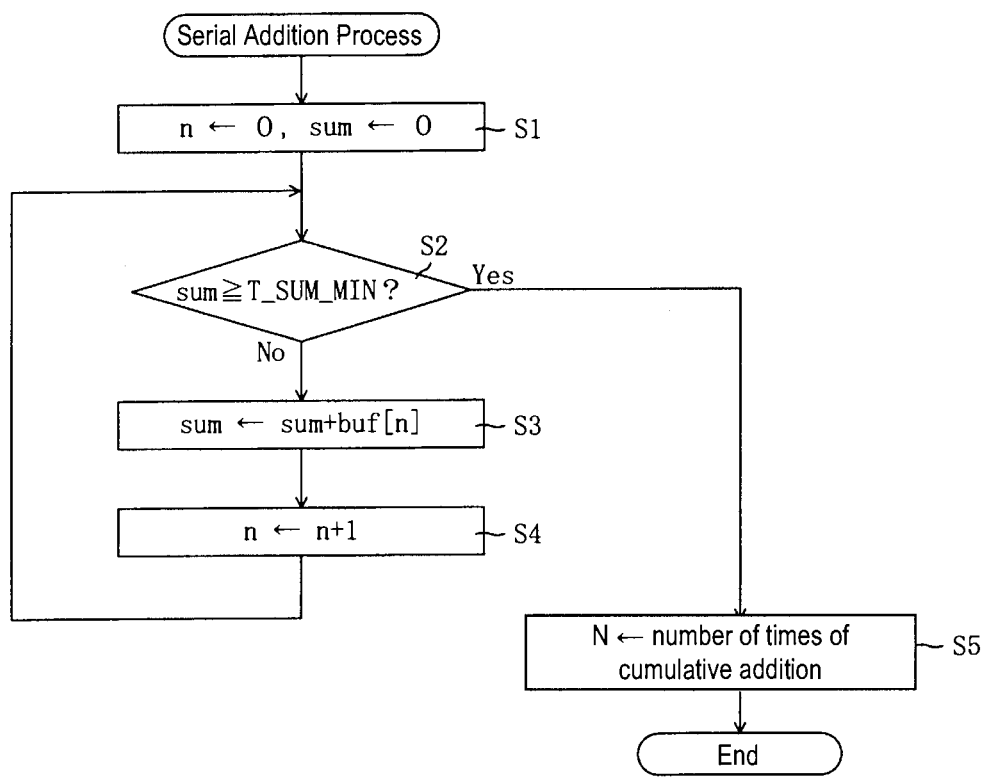
FIG. 4 is a flowchart of a serial addition process according to an embodiment of the present invention.

Next, the CPU 11 carries out a serial addition process (Step c). The serial addition process cumulatively adds, for every 1 cycle, the respective intervals the cycles that have been discretely measured. A flowchart illustrating the serial addition process is illustrated in FIG. 4.

In the serial addition process, first in step S1, n and the cumulative addition time sum are initialized. n is a variable that indicates the (n+1)-th measurement value (in the (n+1)-th cycle). The cumulative addition time sum is the cumulative time (total time in seconds) of each 1 cycle, buf[0], buf[1], ..., buf[n].

$$\text{sum}=buf[0]+buf[1]+\ldots buf[n], \quad (5)$$

Next in step S2, a determination is made whether the cumulative addition time sum is at or above the constant T_SUM_MIN. The constant T_SUM_MIN (units: seconds (s)) is the smallest measurement time of the pitch measurement needed to obtain the required error accuracy. The constant T_SUM_MIN is theoretically calculated from the following numerical formula (6) and numerical formula (7) described later.

$$p=1+1/\{2^{(d/1200)}-1\} \quad (6)$$

Numerical formula (6) is obtained by varying numerical formula (1). With this formula, if the required error accuracy d has been determined, the number of clocks p that becomes necessary in order to satisfy the required error accuracy d can be calculated (irrespective of the clock signal frequency Fc).

For instance, for the tuner 1, as mentioned earlier, because the required error accuracy is ±1 cent, when the absolute value (=1) of d is substituted into the numerical formula (6), p=1731.734 can be obtained. This p (i.e., the constant SUM_MIN) indicates the smallest number of clocks necessary to obtain the required error accuracy (±1 cent). In this case, because the number of clocks is an integer, p may be rounded to 1732. Thus, 1732 is the smallest number of clocks necessary to obtain the required error accuracy. As such, the constant SUM_MIN=1732.

Furthermore, the constant T_SUM_MIN, as mentioned before, indicates the smallest measurement time needed to obtain the required error accuracy (in this case, ±1 cent).

$$T\_SUM\_MIN = SUM\_MIN/Fc \qquad (7)$$

Thus, the smallest measurement time needed to obtain the required error accuracy can be found by dividing the smallest number of clocks needed to obtain the required error accuracy by the clock signal frequency Fc. As shown in numerical formula (7), the constant T_SUM_MIN is calculated using the constant SUM_MIN. Thus, in this case, the constant T_SUM_MIN is 52.86 ms (which is 1732 divided by 32.768 kHz).

Next in step S2, if the cumulative addition time sum is less than the constant T_SUM_MIN (S2: No), buf [n] (i.e., the interval of 1 cycle of a musical note in the n+1 cycle) is cumulatively added to the cumulative addition time sum (step S3). Then, in step S4, the CPU 11 (e.g., FIG. 2) increases n by one. The process returns to the decision in step S2. By repeating steps S2-S4, the interval of 1 cycle of a musical note is sequentially cumulatively added for each 1 cycle of musical note.

In the decision of step S2, when the cumulative addition time sum is (or greater than) the constant T_SUM_MIN (S2: Yes), the number of times cumulative addition is carried out by the serial addition process becomes N (step S5). For instance, when buf [0] and buf [1] have been cumulatively added, N becomes two. When buf [0], buf [1], and buf [2] have been cumulatively added, N becomes three. After this, the serial addition process ends.

Furthermore, with respect to step S5, N (i.e., the number of times that cumulative addition is carried out by the serial addition process) indicates what cycle portion (i.e., frequency portion) of the musical note has been cumulatively added. In addition, N (i.e., the number of times of cumulative addition carried out by the serial addition process) is the smallest number of times of cumulative addition for the cumulative addition sum to equal (or exceed) the constant T_SUM_MIN.

Figure 5:
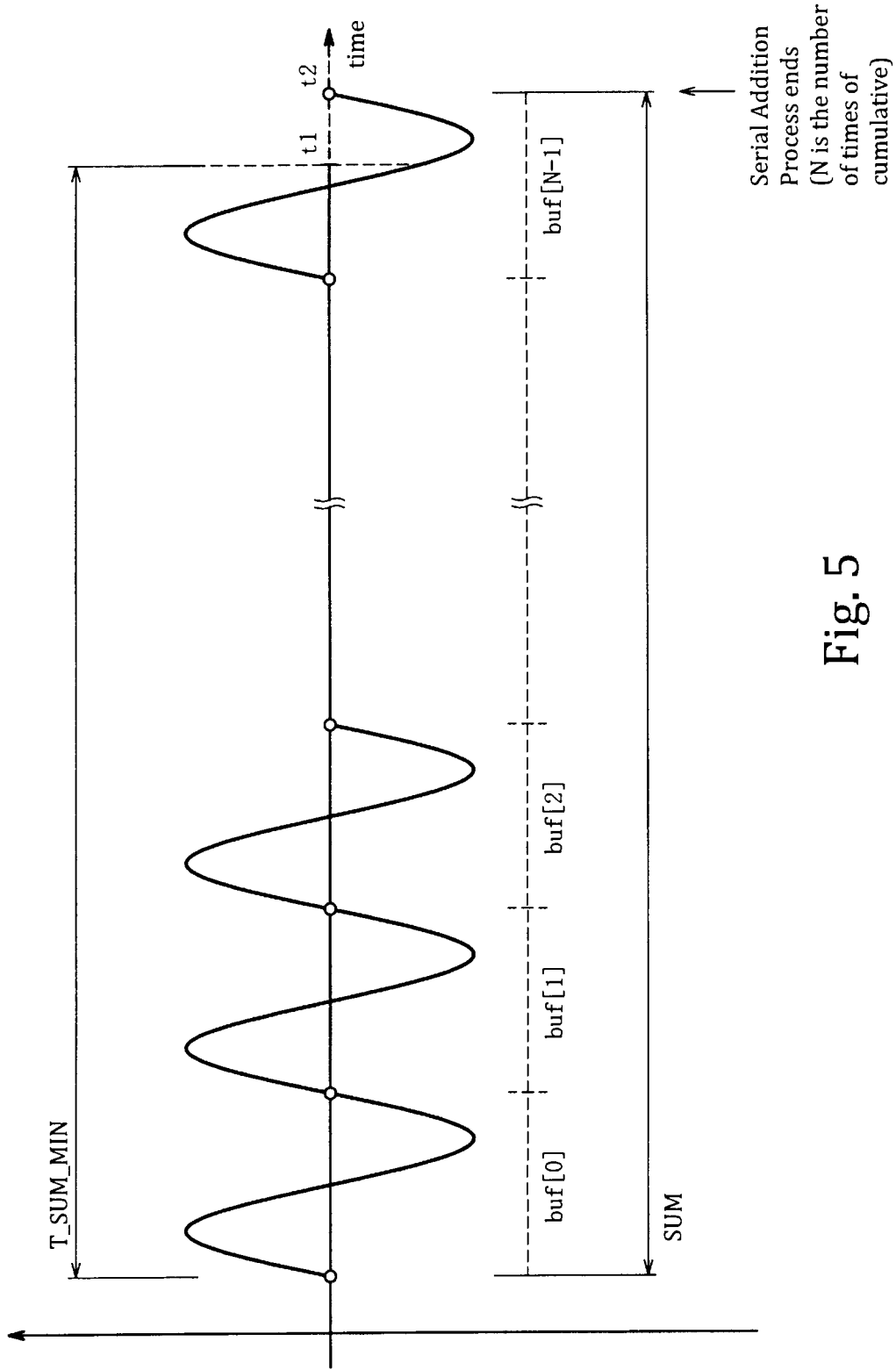
FIG. 5 is a schematic diagram illustrating the relationship of a cumulative addition time sum and a constant T_SUM_MIN in the case in which it is judged "Yes" at S2 according to an embodiment of the present invention.

FIG. 5 is a schematic diagram illustrating the relationship of the cumulative addition time sum and the constant T_SUM_MIN when the cumulative addition time sum equals (or exceeds) the constant T_SUM_MIN (S2: Yes).

As noted, when the cumulative addition time sum first (equals or) exceeds the constant T_SUM_MIN, the cumulative addition time sum obtains the smallest number of times N of cumulative addition that satisfies the constant T_SUM_MIN or more. That is, when step S2: Yes (FIG. 4), the required error accuracy has been satisfied, and the number of times of cumulative addition is N. Following this, the serial addition process ends.

Returning to FIG. 3, next, the CPU 11 carries out the average process (Step d) using the cumulative addition time sum (cumulative addition time cumulatively added by the serial addition process), and the smallest number of times N of cumulative addition in which the cumulative addition time sum (obtained by the serial addition process) equals (or exceeds) the constant T_SUM_MIN to find the 1 cycle average duration (average cycle) of a musical note. In addition, a reciprocal of the average cycle allows the pitch of the musical note acquired by the mic 3 to be determined.

Next, the CPU 11 calculates the deviation of the standard pitch that was set from the pitch of the musical note found by the average process and executes the indication process that displays the calculated deviation in the analog indicator 4 (Step e). In addition, parallel to the indication process, the CPU 11 (together with initializing the respective values of the cumulative addition time sum and buf) returns to Step a and again executes the measurement process.

As shown in FIGS. 4 and 5, in the serial addition process (Step c of FIG. 3), the measurement times buf [0], buf [1], . . . in each cycle of 1 cycle of a musical note gathered by the mic 3 are sequentially, cumulatively added for every 1 cycle until the cumulative addition time sum equals (or exceeds) the constant T_SUM_MIN. As the duration of 1 cycle of a musical note shortens, the pitch of the musical note increases, which causes the number of times N of cumulative addition to increase. On the other hand, as the duration of 1 cycle of a musical note lengthens, the pitch of the musical note lowers, which causes the number of times N of cumulative addition to decrease. However, in either instance the cumulative addition time sum becomes equal to (or greater than) the constant T_SUM_MIN. Here, the constant T_SUM_MIN, as mentioned before, is the smallest measurement time of the pitch measurement of a musical note necessary to realize the required error accuracy. Consequently, the pitch of the musical note calculated by the average process (Step d in FIG. 3) using the cumulative addition time sum satisfies the required error accuracy.

In the following example, the detection range of the frequency f of the measured signal is regarded as 30.9 Hz-659 Hz. First, in the case of the lower limit frequency f=30.9 Hz, from numerical formula (3'), it is known that the smallest number N of times of cumulative addition that equals (or exceeds) the constant T_SUM_MIN (i.e., the constant SUM_MIN=1732 (clocks)) is two. The number of clocks p of this time can be determined (from numerical formula (3')), p=2121. Accordingly, from numerical formula (1), the pitch measurement error d=0.816 cent, which satisfies the required error accuracy ±1 cent. Second, in the case of the upper limit frequency f=659 Hz, the smallest number of times N of cumulative addition that equals (or exceeds) the constant SUM_MIN=1732 (clocks) amounts to 35. Here, the number of clocks of this time is p=1740 and the pitch measurement error d=0.995 cent, which satisfies the required error accuracy ±1 cent.

Next, the reason the response time t satisfies the required response time that is within 150 ms will be explained. As is shown in FIGS. 4 and 5, in the serial addition process (Step c in FIG. 3), when the cumulative addition time sum has amounted to the constant T_SUM_MIN, the cumulative addition ends. Accordingly, because the end of the cumulative addition is regarded as the case in which the cumulative addition time sum is equal to (or exceeds) the constant T_SUM_MIN (which is the smallest measurement time), the smallest time of the response time t (time until the pitch of a musical note is newly calculated by the average process (Step d in FIG. 3)) becomes the constant T_SUM_MIN.

In the following example, the detection range of the frequency f of the measured signal is regarded as 30.9 Hz-659 Hz. The cycle length of 1 cycle of the frequency f=30.9 Hz of the lowest sound of a measured signal is 32.36 ms (i.e., 1/30.9

Hz). The cycle length of 1 cycle of the frequency f=659 Hz of the highest signal is 1.52 ms (i.e., 1/659 Hz). As discussed above, the constant T_SUM_MIN=52.86 (i.e., 1732/32.768 kHz)). From this, it can be seen that the upper limit of the range the response time t can take is less than 85.22 ms (i.e., =52.86 ms+32.36 ms) with the lowest sound, and less than 54.38 ms (i.e., =52.86 ms+1.52 ms) with the highest sound. Both of these response times are within the required response times of 150 ms.

According to prior art methods, the number of times of cumulative addition is carried out only a predetermined number of times without regard to the highs and lows of the pitch of a musical note. As can be seen from numerical formula (2), as the frequency of the measured signal decreases, the response time increases in inverse proportion thereto. However, according to various embodiments, the tuner 1 is configured such that the response time t, regardless of the highs and lows of the pitch of a musical note, is a time that approximates the constant T_SUM_MIN. Thus, the range of the variations of the response time t can be held to within less than the duration of 1 cycle of a measured signal (measured musical note).

Furthermore, because the scope of the variations of the response time t is limited to within less than the duration of 1 cycle of a measured signal, the longest value of the variations of pitch measurement time that can be assumed is determined by the duration of 1 cycle of the lowest sound of the measured signal.

Furthermore, if the required error accuracy is determined, the constant T_SUM_MIN (by using numerical formula (6) and numerical formula (7)) can be uniquely determined from the frequency of the clock signal (Fc). Using these results, the tuner 1 may be configured such that a response time t that is within the required response time can be used to determine the frequency of a clock signal. Specifically, using numerical formula (6) and numerical formula (7), the sum of the duration of 1 cycle of the lowest note of the measured signal (e.g., 32.36 ms) added to the constant T_SUM_MIN (e.g., 52.86 ms) may be used to determine the frequency of the clock signal (Fc) so as to not exceed the required response time.

As such, in various embodiments, after both the musical note pitch error accuracy d and the response time t have satisfied the values required as design conditions (after having been maintained in values that have no problem from a practical standpoint), the frequency of the clock signal can be lowered to, for example, 32.768 kHz, to reduce the current consumption.

As discussed, according to various embodiments, when the cumulative addition time sum is determined to equal or exceed the constant T_SUM_MIN (S2: yes in FIG. 4), the serial addition process (Step c in FIG. 3; FIG. 4) obtains the smallest number of times N of cumulative addition in which the cumulative addition time sum satisfies the constant T_SUM_MIN or above (S5 in FIG. 4), and the cumulative addition ends. As such, the serial addition process continues cumulative addition until the cumulative addition time sum becomes equal to or greater than the constant T_SUM_MIN. Consequently, the pitch of a musical note calculated using the cumulative addition time sum can reliably be regarded as satisfying the required error accuracy.

According to various embodiments, the constant T_SUM_MIN that shows the smallest measurement time of the pitch measurement of musical notes that becomes necessary in order to realize the required error accuracy (e.g., using numerical formula (6) and numerical formula (7)) is calculated from the required error accuracy d and the clock signal frequency Fc. Accordingly, the constant T_SUM_MIN can be found with simple calculations after the required error accuracy has been determined.

In various embodiments, when the cumulative addition time sum is equal to (or greater than) the constant T_SUM_MIN, the serial addition process obtains the smallest number of times N of cumulative addition in which the cumulative addition time sum satisfies the constant T_SUM_MIN or above (S5), and the cumulative addition ends. In other embodiments, the cumulative addition sum may be compared to other values other than the constant T_SUM_MIN.

For instance, in a case where the number of times N is 3 or less, pitch detection mistakes due to noise or the like may occur because of the small (insufficient) number of cycles of the signal. In such a case, the number of times N may be replaced the prescribed number of times M (e.g., 4 or more) as long as M satisfies the required response time that is the design condition. As such, pitch detection mistakes due to noise and disturbance can be reduced, and accordingly stable pitch detection can be obtained.

In various embodiments, in Step b (FIG. 3), the number of clocks counted in 1 cycle of a musical note are converted into time by the frequency Fc of the clock signal (i.e., by dividing by Fc), and the duration of 1 cycle of musical note is calculated for each 1 cycle (refer to numerical formula 4). Furthermore, in Step c, the constant SUM_MIN is divided by the Frequency Fc of the clock signal to calculate the constant T_SUM_MIN (refer to numerical formula (7)). In other embodiments, in Step b and/or Step c, time conversion by the clock signal Frequency Fc (i.e., diving by the clock signal frequency Fc) may be omitted.

For instance, in Step b, the number of clocks themselves counted in 1 cycle of a musical note are substituted into buf' [0], buf' [1], . . . , buf' [n] (as distinguished from buf [0], buf [1], . . . , buf[n]) for each 1 cycle of musical note. Next, in Step c, cumulative addition may occur for every 1 cycle of musical note, buf' [0], buf' [1], . . . buf' [n] until the number of their cumulatively added clocks sum' (the total number of clocks of the clock signal cumulatively added by serial addition process) amounts to (or exceeds) the constant SUM_MIN as calculated with numerical formula (6) (without calculating constant T_SUM_MIN).

Then, in Step d, the average process is carried out using the number of cumulatively added clocks sum' and the number of times of cumulative addition carried out in the serial addition process (the number of times of detection of the cycles of a measured signal). Specifically, the number of cumulatively added clocks sum' may be divided by the smallest number of times N of cumulative addition (in which the number of cumulatively added clocks sum' satisfies the constant SUM_MIN or more). Then the average number of clocks of the clock signal counted in 1 cycle of a musical note can be found, and the clock signal frequency Fc can be divided by the average number of clocks.

Also, in the above configuration, the current consumption can be restrained by lowering the clock signal frequency to, for example, 32.768 kHz, after both the musical note pitch error accuracy d and the response time t have satisfied values required as design conditions.

Furthermore, in various embodiments, any suitable pitch calculation process that converts buf [n], sum, T_SUM_MIN to an arbitrary unit other than the above-mentioned units of seconds or units of number of clocks (unit that regards 1/Fc as 1 clock) may be employed.

In various embodiments, as discussed, when the clock signal frequency Fc is 32.768 kHz (which provides a constant T_SUM_MIN of 52.86 ms), the upper limit of the response time t becomes less than 54.38 ms (659 Hz) and less than 85.22 ms (30.9 Hz), both of which were within the required response time of 150 ms.

In other embodiments, the constant T_SUM_MIN may be another value, for instance, greater than 52.86 ms. For example, the constant T_SUM_MIN may be (but not limited to) 105.72 ms (i.e., double 52.86 ms). In this case, also, the upper limit of the response time t is less than 107.24 ms (659 Hz) and less than 138.08 ms (30.9 Hz)), both of which are within the required response time of 150 ms. Changing the constant T_SUM_MIN in this manner may help to account, for example, for any erroneous decisions, etc., due to noise at the time of autocorrelation process (at the time of Step b).

Furthermore, when the constant T_SUM_MIN is increased in such a manner, error accuracy can be further increased. As previously discussed, the constant SUM_MIN can be determined using numerical formula (6). With the constant SUM_MIN determined, the consonant T_SUM_MIN can be determined according to numerical formula (7). The constant T_SUM_MIN indicates the "lowest limit" measurement time necessary to realize the required error accuracy. Accordingly, for a measurement time T_SUM_MIN', which is made longer than the constant T_SUM_MIN, the number of clocks included in the cumulative time also increases. As such, according to numerical formula (1), which calculates the pitch error accuracy when the number of clocks p increases, the value of the pitch error accuracy d becomes smaller. Thus, pitch measurement accuracy can be increased. Accordingly, when the clock signal frequency Fc is fixed, pitch measurement accuracy can be increased by carrying out pitch detection using the constant T_SUM_MIN' that has become longer than T_SUM_MIN (i.e., the measurement time of the lowest limit necessary to realize the required error accuracy).

In various embodiments, the pitch error accuracy d is ±1 cent and the response time t is within 150 ms. In other embodiments, one or both of the pitch error accuracy and the response time may be set at different values. For example, the required response time t may be set to be within 500 ms. In this case, the clock signal frequency Fc can be reduced further than if the required response time is within 150 ms.

Increasing the required response time t increases the constant T_SUM_MIN that is the smallest measurement time. As shown in numerical formula (7), the constant T_SUM_MIN is inversely proportional to the clock signal frequency Fc. This relationship is shown in the graph of function $f(x)$ in FIG. 6. As shown, the constant T_SUM_MIN is determined by the function (x), when the corresponding clock signal frequency is Fc indicates the measurement time "of the shortest limit" that is necessary to realize the required error accuracy. Accordingly, if the response time is lengthened, (i.e., if the value of the constant T_SUM_MIN becomes larger), shown in FIG. 6, it can be seen that the clock frequency can be lowered.

Figure 6:
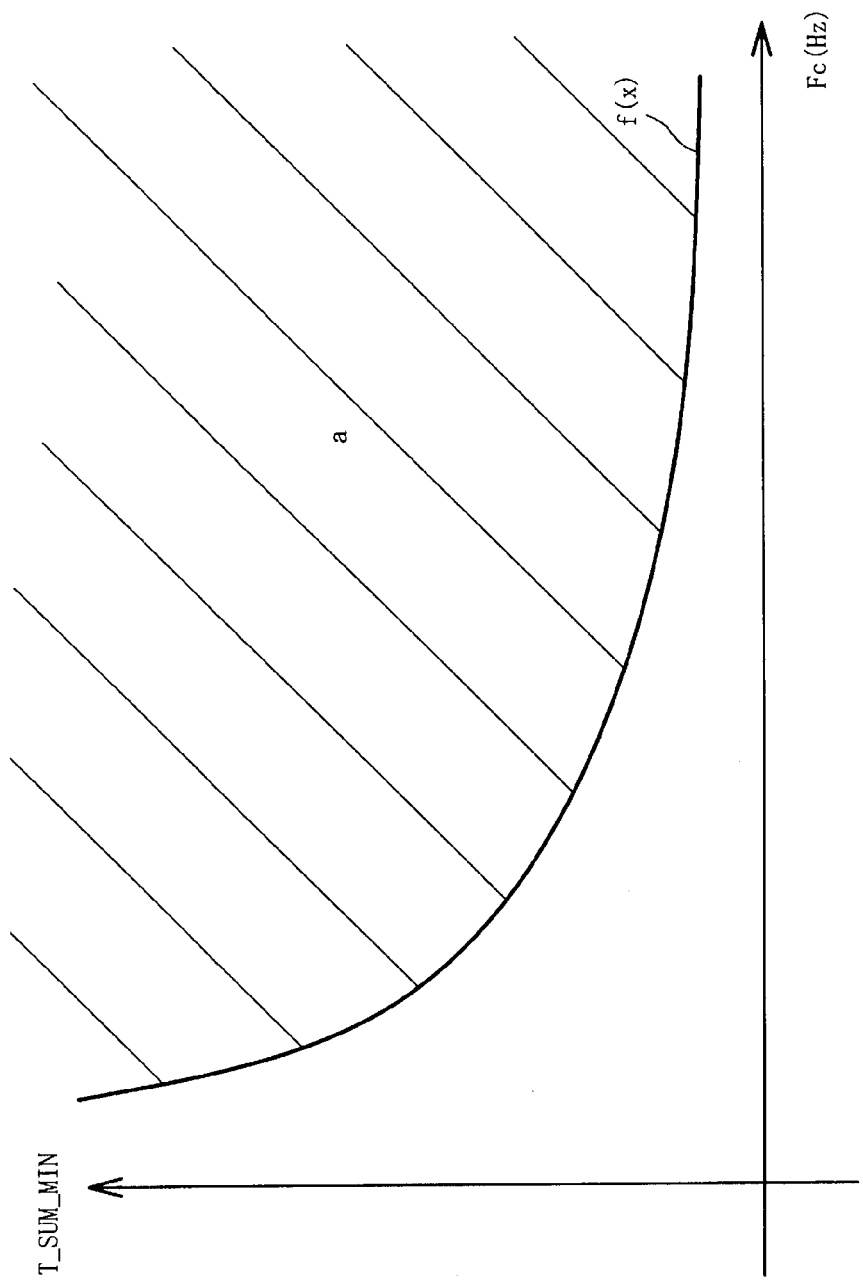
FIG. 6 is a chart illustrating the relationship of a frequency Fc and a constant T_SUM_MIN according to an embodiment of the present invention.
Figure 7:
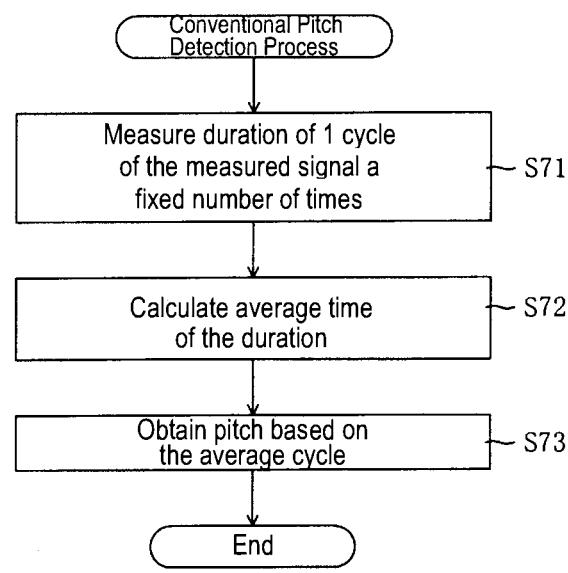
FIG. 7 is a flowchart illustrating a prior art pitch calculation method.

In addition, FIG. 6 demonstrates that for a certain fixed clock signal frequency Fc (arbitrary value), measurement accuracy can be increased by using pitch detection of the constant T_SUM_MIN' that has a longer measurement time than the constant T_SUM_MIN (which is the lowest measurement time necessary to realize the required error accuracy). Specifically, for a certain fixed clock signal frequency Fc (arbitrary value), the constant T_SUM_MIN is a coordinate point on the graph of function (x). The constant T_SUM_MIN', which has a longer measurement time than the constant T_SUM_MIN, is in a region a that exceeds the graph of the function (x). This demonstrates that when pitch detection is carried out using a clock signal frequency Fc that has a coordinate point within the region a and constant T_SUM_MIN', a pitch detection (that is longer than the measurement time of the "minimum limit" that becomes necessary in order to realize the required error accuracy) can be carried out.

Furthermore, FIG. 6 demonstrates that when the constant T_SUM_MIN' is fixed, the pitch measurement accuracy changes in response to the frequency Fc of the clock signal. In particular, as can be seen from numerical formula (7), when the constant T_SUM_MIN' is fixed and the clock signal frequency Fc is increased, the constant SUM_MIN' (the number of clocks included within the cumulative time) increases as well causing the pitch measurement accuracy to increase. On the other hand, when the clock frequency Fc decreases, the constant SUM_MIN' decreases, and, thus, the pitch measurement accuracy also lowers. Here, for any value of the clock signal frequency Fc and any value of the constant T_SUM_MIN' that exists within the region a, the pitch measurement accuracy, at least, satisfies the required accuracy d. Furthermore, from FIG. 6, it can be seen that for any coordinate point within the region a, the pitch measurement accuracy improves the further the coordinate point is located from the graph of the function $f(x)$.

With reference to FIGS. 1-6, in various embodiments, the tuner device 1 may be configured to indicate when the processing (e.g., the serial addition process) is in progress and/or incomplete. For instance, when the required response time is 500 ms, during execution of the serial addition process (Step c in FIG. 3) the digital indicator 2 may flash. When the serial addition process has completed, the digital indicator 2 may light up and/or a separate indicator (that is part of the digital indicator 2 or separate altogether) may light up in addition to the digital indicator 2 to indicate that the pitch calculation has completed. Thus, even if the required response time increases, a user can easily comprehend whether the tuner device 1 is in the middle of pitch detection or the detection of the pitch of a musical note has been completed.

In various embodiments, the required error accuracy and the required response time are set in advance at the time of design. In other embodiments, one or both of the required error accuracy and required response time may be adjustable by the user. As such, the constants T_SUM_MIN and SUM_MIN used with the tuner 1 become variables. Accordingly, one or both of the error accuracy and response time of the pitch of a musical note of the tuner 1 can be adjusted to the preference of the user.

In various embodiments, the required error accuracy and required response time are set in advance, and the smallest measurement time that realizes the required error accuracy is found by calculation in advance, and that smallest measurement time found was regarded as time that measures the pitch of a musical note. In other embodiments, the tuner 1 may be configured to allow the user to set the time that measures the pitch of a musical note between a time above the smallest measurement time and a time at or below the required response time. As such, pitch error accuracy may be increased relative to the required error accuracy.

In various embodiments, when constant T_SUM_MIN is fixed and when the cumulative time is equal to (or greater than) the constant T_SUM_MIN, pitch detection of a musical note that was input is carried out. In other embodiments, the tuner device 1 may be configured such that when the pitch error accuracy d has become less than the required error accuracy, the cumulative addition that is carried out for each 1 cycle of musical note input ends, and the pitch detection of the input musical note is carried out.

$$d = 1200 \times \log 2(\text{sum}/(\text{sum}-(1/Fc))) \qquad (1'')$$

In particular, numerical formula (1") replaces the number of clocks p of numerical formula (1) by sum×Fc.

Here, the error accuracy required was determined to be 1 cent in advance. If numerical formula (6) is used, the constant T_SUM_MIN (=52.86 ms) that indicates the smallest measurement time of a clock signal that becomes necessary to realize a pitch error accuracy d of 1 cent or less was obtained. However, if numerical formula (1"), which does not use the constant T_SUM_MIN, is used, the obtained result will be the same as if the numerical formula (6) had been used. That is because under both the numerical formula (6) and the numerical formula (1"), the respective smallest values (i.e., p for numerical formula (6); sum×Fx for numerical formula (1")) that satisfy the pitch error accuracy d is the same In various embodiments, a method that detects the rising zero cross (single edge zero cross detection) may be used. In other embodiments, a method that detects both the rising zero cross and the falling zero cross (both edge zero cross method) may be used. In other embodiments, a method based on peak detection may be used.

In various embodiments, in the measurement process (Step a in FIG. 3), 1 cycle of a musical note obtained by the mic 3 was output using a zero cross interrupt signal output from a comparator 14. In other embodiments, a musical note may be recorded to RAM 13 via an AD converter (analog digital converter), and the time between zero cross intervals can be determined by the CPU 11 (or, DSP: digital signal processor).

In various embodiments, the tuner 1 calculates the pitch of a musical note and displays the deviation of the calculated pitch from the standard pitch on an analog indicator 4.

In some embodiments, the calculated pitch can be used as a parameter, for example, to be used to create an effect sound to a collected musical note, or used by an effector or other effect device that applies modulation. In particular embodiments, the indication process may be omitted.

In some embodiments, the tuner 1 allows for reduced power consumption. In other embodiments, a desired effect sound may be created (based on the pitch calculation results) that have a wide pitch range from low notes to high notes by raising the pitch error accuracy d or shortening the response time t, is regarded as the purpose. For example, a doubling effector adds a vocal 1 voice that sings a unison part to vocal input and a harmonizer that adds notes shifted a designated pitch portion with respect to the pitch of musical notes that have been collected, and/or the like.

In various embodiments, the tuner device 1 may be configured to lower the frequency of a clock signal, after having maintained both the pitch error accuracy of a measured signal and the response time at practical values.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention.

What is claimed is:

1. A pitch detection device, the device comprising:
an input means for inputting a signal;
a clock generation means for generating a clock signal;
a pitch calculation means for calculating a pitch of the signal by determining a duration of one cycle of the signal that regards one clock of the clock signal as the smallest base unit;
a cycle detection means for detecting one cycle of a waveform of the signal;
a cycle measurement means for discretely measuring a measurement time of one cycle of the signal during one clock of the clock signal, for each one cycle of the signal detected by the cycle detection means;
a cumulative cycle measurement means for cumulatively adding, for every one cycle of the signal, the measurement time corresponding to each one cycle of the signal measured by the cycle measurement means to obtain a cumulative time, the cumulative adding ending when the cumulative time equals or exceeds a smallest measurement time that realizes a required pitch error accuracy; and
a frequency counting means for counting frequencies of the signal included within the cumulative time when the cumulative adding ends;
wherein the pitch calculation means calculates the pitch of the signal from the cumulative time and a number of the counted frequencies.

2. The device of claim 1, wherein the smallest measurement time is calculated from (i) the required pitch error accuracy when the pitch of the signal is calculated by the pitch calculation means and (ii) a frequency of the clock signal regarded as the smallest base unit when the cycle measurement means measures the measuring time of the one cycle of the signal.

3. A pitch detection device, the device comprising:
an input means for inputting a signal;
a clock generation means for generating a clock signal;
a pitch calculation means for calculating a pitch of the signal by determining a number of clocks in one cycle of the signal that regards one clock of the clock signal as the smallest base unit;
a cycle detection means for detecting one cycle of a waveform of the signal;
a clock counting means for counting the number of clocks of one cycle of the signal, for each one cycle of the signal detected by the cycle detection means;
a cumulative clock counting means for cumulatively adding, for every one cycle of the signal, the number of clocks corresponding to each one cycle of the signal counted by the clock counting means to obtain a cumulative number of clocks, the cumulative adding ending when the cumulative number of clocks equals or exceeds a smallest number of clocks that realizes a required pitch error accuracy; and
a frequency counting means for counting frequencies of the signal included within the cumulative number of clocks when the cumulative adding ends;
wherein the pitch calculation means calculates the pitch of the signal from a frequency of the clock signal, the cumulative number of clocks, and a number of the counted frequencies.

4. The device of claim 3, wherein the smallest number of clocks is calculated from the required pitch error accuracy when the pitch of the signal is calculated by the pitch calculation means.

5. A pitch detection device, the device comprising
an input terminal configured to input an audio signal;
a clock generator configured to generate a clock signal;
a processor configured to calculate a pitch of the audio signal by determining a duration of one cycle of the audio signal that regards one clock of the clock signal as the smallest base unit, the processor configured to measure a measurement time of one cycle of the audio signal using one clock of the clock signal as the smallest base unit;

the processor configured to obtain a cumulative time by adding the measurement times of one or more cycles of the audio signal until the cumulative time equals or exceeds a threshold;

wherein the processor is configured to calculate the pitch of the audio signal based on the cumulative time and the number of times the measurement times was added until the cumulative time equaled or exceeded the threshold.

6. The device of claim 5, wherein the threshold is a smallest measurement time that realizes a required pitch error accuracy.

7. The device of claim 6, wherein the smallest measurement time is calculated from (i) the required pitch error accuracy when the pitch of the signal is calculated and (ii) a frequency of the clock signal.

8. The device of claim 6, wherein the required pitch error accuracy is ±1 cent.

9. The device of claim 5, wherein the clock generator is configured to generate the clock signal at a frequency of 32.786 kHz.

10. A pitch detection device, the device comprising
an input terminal configured to input an audio signal;
a clock generator configured to generate a clock signal;
a processor configured to calculate a pitch of the audio signal by determining a number of clocks of one cycle of the audio signal that regards one clock of the clock signal as the smallest base unit, the processor configured to count a number of clocks of the cycle;

the processor configured to obtain a cumulative number of clocks by adding the number of clocks of one or more cycles of the audio signal until the cumulative number of clocks equals or exceeds a threshold;

wherein the processor is configured to calculate the pitch of the audio signal based on a frequency of the clock signal, the cumulative number of clocks, and the number of times the number of clocks were added until the cumulative number of clocks equaled or exceeded the threshold.

11. The device of claim 10, wherein the threshold is a smallest number of clocks that realizes a required pitch error accuracy.

12. The device of claim 11, wherein the smallest number of clocks is calculated from the required pitch error accuracy.

13. The device of claim 11, wherein the required pitch error accuracy is ±1 cent.

14. The device of claim 10, wherein the clock generator is configured to generate the clock signal at a frequency of 32.786 kHz.

* * * * *